United States Patent [19]

Kehm et al.

[11] Patent Number: 5,090,965
[45] Date of Patent: Feb. 25, 1992

[54] PROCESS FOR THE SEPARATION OF SUBSTANCES BY COOLING CRYSTALLIZATION

[75] Inventors: Detlef Kehm, Dinslaken; Bodo Weicht; Joachim George, both of Leverkusen, all of Fed. Rep. of Germany

[73] Assignee: Bayer Aktiengesellschaft, Leverkusen, Fed. Rep. of Germany

[21] Appl. No.: 387,327

[22] Filed: Jul. 28, 1989

[30] Foreign Application Priority Data

Aug. 12, 1988 [DE] Fed. Rep. of Germany ....... 3827455

[51] Int. Cl.⁵ .............................................. B01D 9/02
[52] U.S. Cl. .................................... 23/295 R; 23/296; 23/299; 422/245; 568/937
[58] Field of Search ............ 423/659; 23/295 R, 295, 23/296; 422/245, 251, 252

[56] References Cited

U.S. PATENT DOCUMENTS

| | | | |
|---|---|---|---|
| 2,854,494 | 9/1958 | Thomas | 422/251 |
| 2,895,835 | 7/1959 | Findlay | 422/251 |
| 3,261,170 | 7/1966 | McCarthy et al. | 422/251 |
| 3,267,686 | 8/1966 | Holley | 422/251 |
| 3,510,266 | 5/1970 | Midler, Jr. et al. | 422/252 |
| 4,202,859 | 5/1980 | Madsen et al. | 422/245 |
| 4,400,189 | 8/1983 | Arkenbout et al. | 422/251 |
| 4,597,768 | 7/1986 | Thijssen et al. | 585/834 |
| 4,743,434 | 5/1988 | Thijssen et al. | 422/251 |
| 4,891,190 | 1/1990 | Carte et al. | 422/251 |
| 4,891,191 | 1/1990 | Carter et al. | 422/251 |

*Primary Examiner*—Gary P. Straub
*Attorney, Agent, or Firm*—Sprung, Horn, Kramer & Woods

[57] ABSTRACT

In the process for the separation of substances by cooling crystallization, the mixture remaining in the crystallizer after separation of the crystal layer is removed and the crystal layer is melted. The process is distinguished in that the mixture, which completely fills the crystallizer, is set into vibration during the process of solidification by movements of oscillation imparted to it and is left in the crystallizer until a degree of solidification of from 50% to 90% has been obtained.

5 Claims, 1 Drawing Sheet

PROCESS FOR THE SEPARATION OF SUBSTANCES BY COOLING CRYSTALLIZATION

This invention relates to a process for the separation of substances from a liquid mixture by a single stage or multi-stage cooling crystallization, in which, after separation of the layer of crystals in the crystallizer, the remaining mixture is removed and the layer of crystals is melted.

Numerous crystallization processes are known which, although not of general applicability, are employed successfully for certain problems of separation. In some of these processes, substances are crystallized from a solvent, and in others substances are crystallized from a melt.

All these processes may be subdivided into two groups. In the first group, a suspension of crystals is produced and this suspension is separated mechanically into crystals and mother liquour by filtration, separation, etc. These processes require relatively expensive apparatus and therefore in most cases cannot be carried out economically.

Moreover, as the size of the apparatus used increases, these processes give rise to considerable mechanical problems associated with the conveyor systems.

In the second group of processes, a coherent layer of crystals is formed so that separation of the crystals from the mother liquour is simplified. This second group covers two different methods of crystallization: crystallization from a stationary liquid phase and crystallization from thin boundary layers of a moving liquid phase.

The first of these methods has the disadvantage that the amount of separation obtained in the individual stages of crystallization is in many cases only slight due to the inclusion of mother liquour and due to dendritic crystal growth resulting from super cooling. The method is therefore difficult to carry out economically.

In the second method described, for example, in DE-AS 17 69 123, the liquid mixture is passed over the cooling surfaces as a trickling film. This method is very suitable for purifying products which form a solid crystal layer with a smooth surface.

DE-AS 26 06 364 describes a process in which a turbulent flow results in the formation of a thin boundary layer from which the crystal layer is formed on the wall of the crystallization zone.

One disadvantage of these known processes is that heat must be supplied for the deflecting and conveyor pipes and the conveyor elements to prevent the formation of crusts, with the result that the temperature of the liquid phase rises to levels above the metastable range of crystallization. Moreover, the heat supplied for this purpose must be removed from the liquid phase over the cooling surfaces of the crystallizer, with the result that the process is uneconomically prolonged. An additional disadvantage is that the introduction of the heated liquid phase results in the formation of crystal layers of uneven thickness in the inflow region of the crystallizer (funnel shaped crystal layers), and this results in a reduction in the volume/time yield and occasionally also causes blockage of the crystallization apparatus.

DE-OS 3 203 818 describes a process in which, without circulation of the liquid phase by means of pumps, the thin boundary layers are produced by means of gas bubbles which are introduced at the bottom of the crystallization container, and the crystal layers are then produced from these on the wall of the crystallization zone. One major disadvantage of this process is that in many cases the gas must be returned for ecological reasons and freed from the condensable component.

Theoretical considerations and experimental investigations have shown that the effective separation performance of crystallization depends mainly on the speed of crystallization and on the diffusion ratios in the boundary layer of the solid/liquid phase interface. Conveyor devices are generally installed in the apparatus for improving the conditions for material exchange and reducing the thickness of the boundary layer.

The problem therefore arose of avoiding the disadvantages of the known crystallization processes and developing a process by which solutions or melts could be efficiently crystallized from thin boundary layers on cooled surfaces without an external circulation of liquid and without the introduction of gas into the crystallizer column.

Proceeding from the process described above, the procedure by which the present invention solves this problem consists in that the mixture, which completely fills the crystallizer, is set into vibrations during the process of solidification by means of turbulent oscillations imparted to the mixture, and the latter is left in the crystallizer until a degree of solidification of from 50% to 90% has been reached.

The process according to the invention may be employed both for crystallization from the solvent free melt of the substance to be separated and for crystallization from the solution of the substance in a solvent and it is suitable for all substances which can crystallize on a solid, mainly metallic surface by the removal of heat from the back of this surface.

The process according to the invention is distinguished from known crystallization processes by numerous disadvantages, as follows:

The crystallizing liquid mixture is not circulated by pumps during the process of crystallization and therefore need not be heated.

Another advantage of the new process is that uniform growth of the crystal layer in the crystallization zones is obtained.

The introduction of gas bubbles into the crystallization surfaces, which in the case of many products requires the use of an additional apparatus for the removal of condensable components, is not required for improving the exchange of heat and materials in this process.

The fluid dynamics of the crystal layer can easily be adapted to the crystallizing mixture.

The increase in dimensions in the axial direction is easily carried out, as is also the increase in the rate of throughput by increasing the number of crystal pipes.

For any given mixture, the degree of solidification can be calculated in known manner from a solidification graph since the degree of solidification is a direct function of the temperature.

For any given system of substances and given dimensions of the crystallizer, the amplitude and frequency of the oscillations are preferably adjusted to provide a mass transfer coefficient of from 0.5 to 20 mm/min, preferably from 2 mm/min to 10 mm/min.

After solidification has been completed and the remaining mixture has been removed, the crystal layer is preferably melted in several temperature stages and the individual fractions thus obtained are collected separately.

In another method of melting the crystal layer, a melt of the same composition is introduced into the crystallizer after the mother liquour has been discharged.

The crystallization apparatus employed for carrying out this crystallization process basically consists of a heat exchanger with a sump attached to the bottom. The apparatus is characterised according to the invention in that an equallizing vessel is provided upstream of the heat exchanger and an oscillating device which imparts a turbulent oscillation stream to the solidifying mixture in the heat exchanger is arranged underneath the sump.

EXAMPLES OF PRACTICAL APPLICATION

Brief Description of the Drawing

The invention is described below with reference to a schematic flow diagram illustrating by way of example the separation of nitrochlorobenzene isomers (NCB).

DETAILED DESCRIPTION

Figure 1:
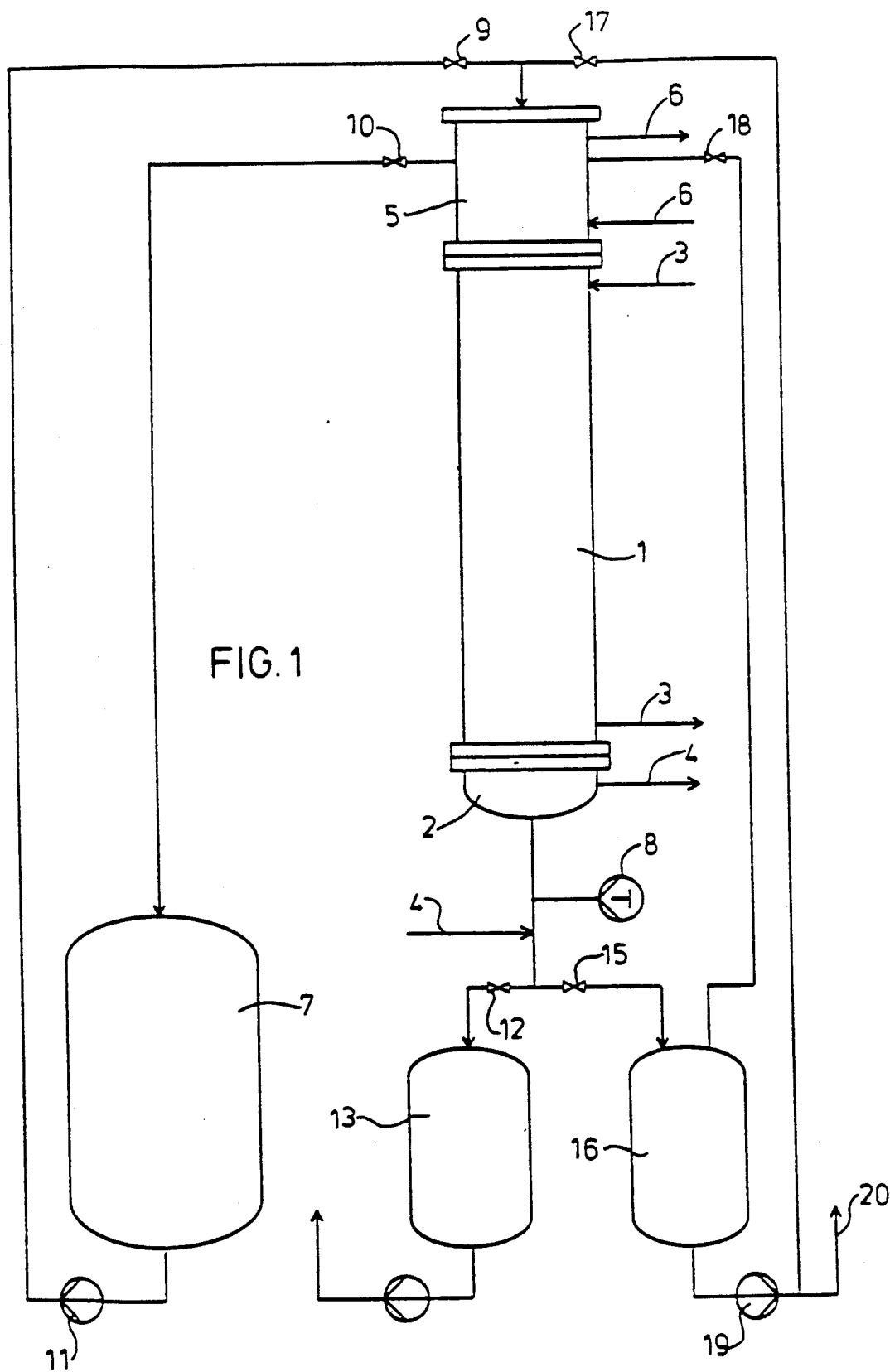

The crystallizer used in this experiment comprised a heat exchanger 1 equipped with a heating and cooling jacket and a sump vessel 2 connected to the bottom of the heat exchanger. The temperature of the crystallizer is controlled by means of the heating and cooling circuits 3, 4. The heat exchangers may be plate heat exchangers or tubular heat exchangers, which can be provided with known means for increasing the cooling surface. In the present example, the internal diameter of the crystallizer tube was 4.25 cm and the cooling length was 90 cm.

An equallizing vessel 5 is arranged above the crystallizer 1. This vessel 5 is also provided with a circulation 6 for adjusting the temperature. The equallizing vessel 5 arranged upstream of the crystallizer 1 has the function of keeping the crystallizer completely filled during the process of solidification as crystal layers of unequal thickness would otherwise develop in the crystallizer.

At the beginning of the experiment, all the substance mixture which is to be crystallized is in the heatable container 7. The oscillating device 8 in the form of an oscillating bellows type pulsator is first switched on and the valves 9 and 10 in the pipes leading to the crystallizer are opened. When the rates of throughput are high, a piston pump or radial piston pump may be used instead of the bellows type pulsator. The molten starting material is then transferred from container 7 to crystallizer 1 by the pump 11. As soon as the equalizing vessel 5 is full, the mixture returns to the reservoir 7 through the pipe with valve 10. The pump 11 is then switched off and the valves 9 and 10 are closed.

The starting material is then solidified in the crystallizer 1. For this purpose, the heat control circulation 3 in the crystallizer 1 is switched from heating medium to cooling medium. The temperature of this cooling medium is 68° C. so that the temperature in the crystallizer 1, which is at the melting point of 90° C. at the beginning of crystallization, falls below the solidification temperature and crystals are therefore deposited on the internal wall of the tubular heat exchanger 1. The temperature of the cooling medium is then lowered to 48° C. in the course of 1 hour. In order to prevent solidification in the equallizing container 5, the heat control circulation 6 is kept at a slightly higher temperature than the heat control circulation 3 for the heat exchanger 1 during the process of crystallization. The oscillating device 8 imparts an oscillating turbulent vertical current with an amplitude of 4 cm and a frequency of 1.67 $s^{-1}$ on the crystallizing mixture in the crystallizer 1. The oscillating current considerably improves the transfer of material during solidification. It is important to keep the crystallizer completely filled with mixture during the phase of solidification. This condition can be fulfilled by means of the equallizing vessel 5 arranged upstream of the crystallizer.

Solidification is completed after a cooling time of 60 minutes with the cooling medium at a final temperature of 48° C. The mother liquour remaining in the crystallizer 1 is then discharged by opening of the valve 12 so that the liquour can flow into the container 13 and the crystal cake is melted. As soon as the liquid level in the container 13 ceases to rise, the valve 12 is closed and the temperature of the heating medium in the circulation 4 connected to the sump 2 is raised to a level above the melting point of the crystal cake in the crystallizer 1. The container 16, which is also connected to the crystallizer (by way of sump 2) through the valve 15 is filled with a melt which is identical in composition to the crystallizing end product in the heat exchanger 1. The container 16 is maintained at a temperature above the melting temperature.

To melt the crystal cake in the crystallizer 1, the valves 17 and 18 at the upper end of the crystallizer are opened and the pure, hot molten product is transferred from the container 16 into the crystallizer by means of the pump 19. The pump 19 is then switched off and the valves 17 and 18 are closed. The crystal cake is then melted by an additional supply of heat through the heat control circulation 3. The melt from the crystal cake mixes with the melt of identical composition which has been pumped up from the container 16. The valve 15 is then reopened and the pure product melt is discharged into the container 16. The pure product can be removed from the container 16 by way of a pipe 20 but part of the pure product remains in the container and is therefore available for melting and discharge of the crystallizate from the next batch.

2130 g of a mixture of 89.7% by weight of p-NCB (nitrochlorobenzene), 9.0% by weight of o-NCB and 1.3% by weight of m-NCB were purified by the above described process under the given temperature and time conditions. The cake obtained after crystallization had been completed weighed 1400 g and had the composition of 95.2% by weight of p-NCB, 4.2% by weight of o-NCB and 0.6% by weight of m-NCB.

EXAMPLE 2

Two stage solidification with sweating in the first stage.

A two stage crystallization is carried out on the same starting material and in the same apparatus as in Example 1 and the crystal cake is sweated after the first stage. The process of solidification of the individual stages is carried out as described in Example 1. The oscillation is in both stages at an amplitude of 4 cm and a frequency of 1.67 $s^{-1}$. In the first stage, the temperature of the cooling medium is lowered from 68° C. to 58° C. within two hours. After the mother liquour has been discharged, the crystal cake is sweated by switching the temperature control circulation 3 from cooling to heating. The temperature of the heating medium is raised from 71° C. to 73° C. within half an hour and the resulting product of sweating is discharged into the container 13 in the same way as the mother liquour. After termination of the sweating process, the crystallizer is again filled with a melt from container 16. This melt is identical in composition to the crystallized end product. The crystal cake is then melted by an additional supply of heat from the temperature control circulation 3 and the melted cake is discharged into the container 16. As soon as no product is left in the container 7, the prepurified product is transferred from container 16 to container 7. The container 13 is emptied of the collected waste liquour which is then used for a further separation.

2,230 g of a mixture of 89.2% by weight of p-NCB, 9.5% by weight of o-NCB and 1.3% by weight of m-NCB were purified by the above described process under the given temperature and time conditions. The completely crystallized cake weighed 1,390 g after the process of solidification and had the composition of 95.7% by weight of p-NCB, 3.7% by weight of o-NCB and 0.6% by weight of m-NCB while the crystal cake obtained after the sweating process weighed 1,300 g and was composed of 96.6% by weight of p-NCB, 3.0% by weight of o-NCB and 0.4% by weight of m-NCB.

In the second stage, crystallization was carried out as in Example 1. The temperature of the cooling medium was lowered from 75.5° C. to 65.6° C. in two hours. Under these conditions, a crystal cake weighing 1,485 g and having the composition of 99.0% by weight of p-NCB, 0.8% by weight of o-NCB and 0.2% by weight of m-NCB is obtained from 2,190 g of melt.

Two stage solidification with a sweating process in the first stage.

Stage 1:
| | | |
|---|---|---|
| Starting material: | p-NCB | 89.2% by weight |
| | o-NCB | 9.5% by weight |
| | m-NCB | 1.3% by weight |
| | 2,230 g | |
| Conditions of solidification: | amplitude | 4 cm |
| | frequency | 100 revs per min. |
| | starting temp. of cooling medium | 68° C. |
| | final temp. of cooling medium | 58° C. |
| | cooling time | 120 min. |
| Crystal cake 1: | p-NCB | 95.7% by weight |
| | o-NCB | 3.7% by weight |
| | m-NCB | 0.6% by weight |
| | 1,390 g | |
| Sweating conditions: | initial temp. | 71° C. |
| | final temperature | 73° C. |
| | heating time | 30 min. |
| Crystal cake 2: | p-NCB | 96.6% by weight |
| | o-NCB | 3.0% by weight |
| | m-NCB | 0.4% by weight |
| | 1,300 g | |

Stage 2:
| | | |
|---|---|---|
| Starting material: | concentration as in Crystal cake 2 | |
| | 2,190 g | |
| Conditions of solidification: | amplitude | 4 cm |
| | frequency | 100 revs per min. |
| | starting temp. of cooling medium | 75.5° C. |
| | final temperature of cooling medium | 65.5° C. |
| | cooling time | 120 min. |
| Crystal cake 1: | p-NCB | 99.0% by weight |
| | o-NCB | 0.8% by weight |
| | m-NCB | 0.2% by weight |
| | 1,485 g | |

We claim:

1. A process for the separation of substances from a liquid mixture at one or more stages of a multistage fractional cooling crystallization comprising the sequentially performed steps of
   a) feeding a quantity of the liquid mixture into a crystallization vessel such that the volume thereof is completely filled,
   b) cooling the enclosed volume of liquid mixture to effect crystallization, while simultaneously imparting an oscillating movement to the enclosed volume of liquid mixture until a degree of solidification of from 50% to 90% is reached to form a solid crystal cake layer on the inner surface of the walls of the crystallization vessel and a remaining mother liquour phase in the crystallization vessel,
   c) withdrawing the remaining mother liquid phase from the crystallization vessel,
   d) melting the crystal cake layer by heating the crystallization vessel and discharging the resulting melt from the crystallization vessel.

2. A process according to claim 1, wherein the amplitude and frequency of oscillation are adjusted, thereby modifying the cooling effect, to provide a mass transfer coefficient of from 0.5 mm/min to 20 mm/min.

3. A process according to claim 2 wherein the amplitude and frequency of oscillation are adjusted to provide a mass transfer coefficient of from 2 mm/min to 10 mm/min.

4. A process according to claim 1, wherein the liquid mixture contains a plurality of substances which are crystallized in a plurality of sublayers within the said solid crystal cake layer and after solidification has been completed and the liquid mixture remaining has been removed the crystal sublayers are melted in several temperature stages and the fractions thus obtained are collected separately.

5. A process according to claim 2, characterized in that a plurality of melts, each corresponding to the composition of a sublayer is introduced sequentially in order to melt said crystal sublayers.

* * * * *

UNITED STATES PATENT AND TRADEMARK OFFICE
CERTIFICATE OF CORRECTION

PATENT NO. : 5,090,965

DATED : February 25, 1992

INVENTOR(S) : Kehm et al.

It is certified that error appears in the above-identified patent and that said Letters Patent is hereby corrected as shown below:

Title Page      U.S. PATENT DOCUMENTS: After " 4,891,190, 1/1990 " delete " Carte et al " and substitute -- Carter et al. --

Signed and Sealed this

Tenth Day of August, 1993

Attest:

MICHAEL K. KIRK

*Attesting Officer*      *Acting Commissioner of Patents and Trademarks*